US008553249B2

(12) United States Patent
Futatsugi

(10) Patent No.: US 8,553,249 B2
(45) Date of Patent: Oct. 8, 2013

(54) PRINTING APPARATUS, RECORDING APPARATUS, INFORMATION PROCESSING APPARATUS, CONTROL METHOD THEREFOR, COMPUTER PROGRAM AND STORAGE MEDIUM

(75) Inventor: Hajime Futatsugi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1872 days.

(21) Appl. No.: 11/480,936

(22) Filed: Jul. 6, 2006

(65) Prior Publication Data

US 2007/0014221 A1 Jan. 18, 2007

(30) Foreign Application Priority Data

Jul. 11, 2005 (JP) ................................ 2005-202102
Jul. 11, 2005 (JP) ................................ 2005-202103

(51) Int. Cl.
*G06F 3/12* (2006.01)
*G06K 15/00* (2006.01)

(52) U.S. Cl.
USPC ........................................ 358/1.15; 358/1.16

(58) Field of Classification Search
None
See application file for complete search history.

(56) References Cited

U.S. PATENT DOCUMENTS 6,182,565 B1 2/2001 Takayama et al. .............. 101/35
2004/0174777 A1 * 9/2004 Pedersen et al. ........... 369/30.76
2005/0169115 A1 8/2005 Nagano et al.

FOREIGN PATENT DOCUMENTS

| | | |
|---|---|---|
| CN | 1629939 | 6/2005 |
| JP | 6-162251 | 6/1994 |
| JP | 11-86504 | 3/1999 |
| JP | 11-102583 | 4/1999 |
| JP | 2000-132874 | 5/2000 |
| JP | 2005-35011 | 2/2005 |
| JP | 2005-182859 | 7/2005 |

OTHER PUBLICATIONS

Chinese Office Action dated Feb. 1, 2008, issued in corresponding Chinese patent application No. 2006-100988204, and English translation.

Notice of Allowance issued from the Korean Intellectual Property Office dated Nov. 29, 2007, issued in corresponding Korean patent application No. 10-2006-0064731.

* cited by examiner

*Primary Examiner* — Dov Popovici

(74) *Attorney, Agent, or Firm* — Fitzpatrick, Cella, Harper & Scinto

(57) ABSTRACT

A printing apparatus connectable to a recording apparatus that records data on a recording medium. An obtaining unit, when the printing apparatus is connected to the recording apparatus, obtains, from the recording apparatus, attribute information regarding data recordable on the recording medium. A printing unit prints in a printable area of the recording medium using the attribute information. An identifier reading unit reads, from the recording medium, an identifier capable of individually identifying the recording medium. A management unit manages the attribute information associated with the identifier.

5 Claims, 11 Drawing Sheets

F I G. 7
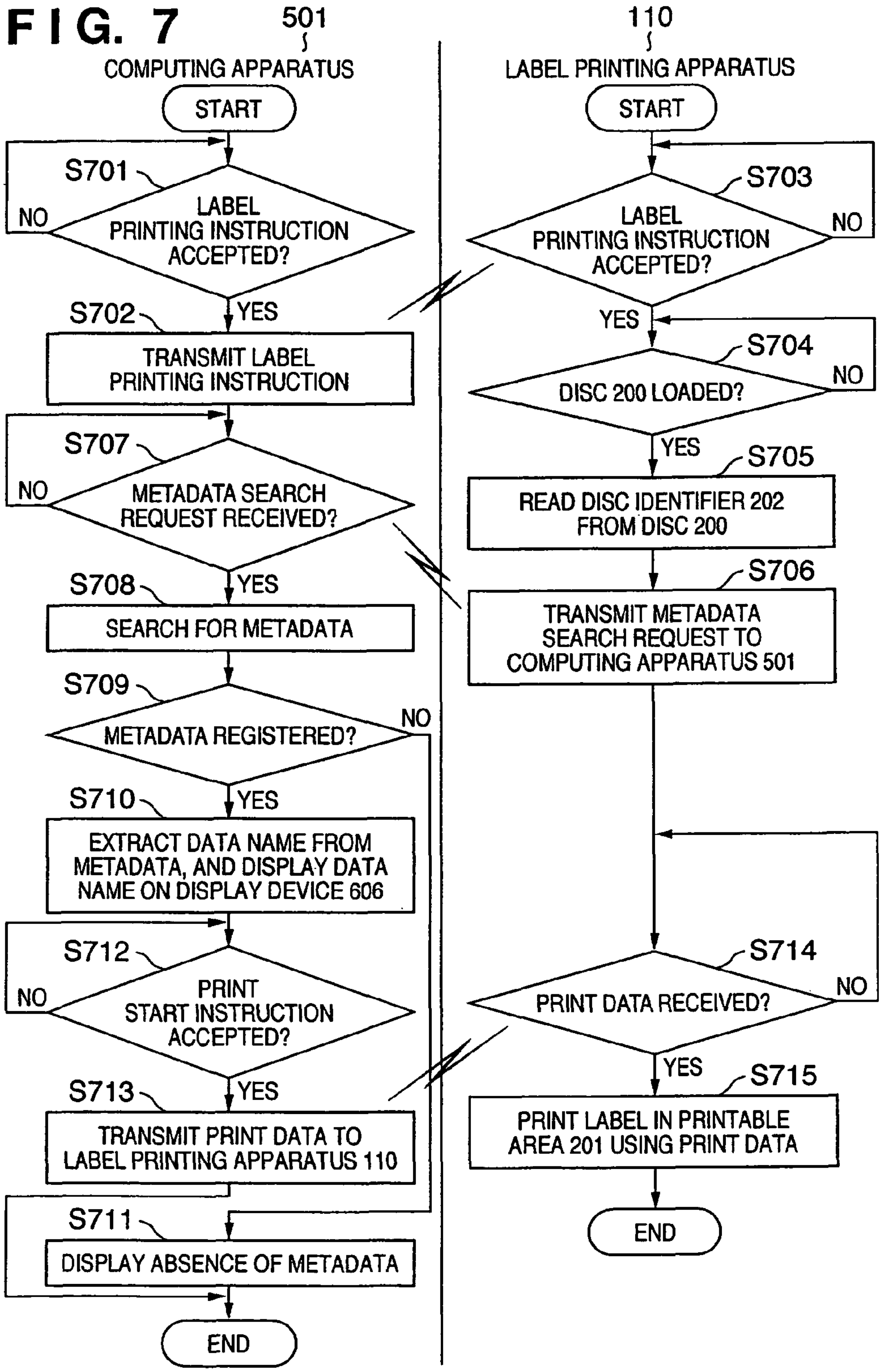

| DISC IDENTIFIER 202 (801) | METADATA (802) |
|---|---|
| ABC12345 | GROUP PHOTO |
| ZCD13145 | EXHIBITION |
| DKS13434 | BIRTHDAY |
| ... | ... |
| ... | ... |
| ... | ... |

PRINTING APPARATUS, RECORDING APPARATUS, INFORMATION PROCESSING APPARATUS, CONTROL METHOD THEREFOR, COMPUTER PROGRAM AND STORAGE MEDIUM

This application claims the benefit of Japanese Patent Application No. 2005-202102, filed on Jul. 11, 2005, and Japanese Patent Application No. 2005-202103, also filed on Jul. 11, 2005, which are hereby incorporated by reference herein in their entirety.

BACKGROUND OF THE INVENTION

1. Field of the Invention

The present invention relates to a printing apparatus, a recording apparatus, an information processing apparatus, a control method therefor, a computer program, and a storage medium.

2. Description of the Related Art

An end user generally records data on a writable recording medium (to be referred to as a disc hereafter), such as a CD-R or DVD-R, to create an original disc. Conventionally, the labels of original discs are formed by manually writing the contents of data directly on the surface of discs, or writing contents on seals and putting the seals on the discs. Recently, printing apparatuses capable of printing in a printable area on a disc surface have prevailed, and even an end user can relatively easily create high-quality labels.

However, to print a label which matches the contents of a disc, the user must properly create a label. There is no means for avoiding printing of a mismatched label. Especially, under the copyright protection function, even if a mismatched label is printed, data cannot be copied again on another disc, placing the burden on the user. As an example of the copyright protection function, data recording on a disc is restricted using a disc capable of individual identification typified by a CPRM (Content Protection for Recordable Media).

To solve this problem, there is proposed an apparatus which is built by integrating a label printing apparatus with a data recording apparatus and which avoids a mismatch between data and a label by simultaneously performing data recording and label printing (see Japanese Patent Laid-Open No. 11-102583). There is also proposed a disc recording system in which write data and corresponding label data, and, in addition, a recording apparatus and a printing apparatus are centralized by a server (see Japanese Patent Laid-Open No. 2005-35011).

As a disc recording apparatus, one which is mounted in a device, such as a PC or a DVD, is popular. However, owing to size limitations and the matter of operability, it has not come into practical use to mount an integral apparatus of a recording apparatus and a printing apparatus in such a device. For the same reason, an apparatus dedicated to disc creation has not generally become popular.

SUMMARY OF THE INVENTION

It is an object of the present invention to make it possible to easily print a label, which matches the contents of a disc, while maintaining a form in which a recording apparatus and a printing apparatus are separated from each other.

As an example of the present invention corresponding to one aspect of the preferred embodiments, a printing apparatus, connectable to a recording apparatus, which manages identification information for identifying data recorded on a recording medium associated with an identifier capable of individually identifying the recording medium, comprises a reading unit adapted to read a first identifier from the recording medium, a transmission requesting unit adapted, when the printing apparatus is connected to the recording apparatus, to request the recording apparatus to transmit first identification information corresponding to the first identifier, a receiver adapted to receive the first identification information transmitted from the recording apparatus in response to the transmission request, and a printing unit adapted to print in a printable area of the recording medium using the first identification information.

As an example of the present invention corresponding to another aspect of the preferred embodiments, a recording apparatus, which records data on a recording medium, comprises a data storage unit adapted to store data, a recording unit adapted to record, on the recording medium, the data stored in the data storage unit, an identification information generation unit adapted to generate identification information for identifying the recorded data on the basis of information regarding the recorded data, an identifier reading unit adapted to read an identifier that is added to the recording medium and enables individually identifying the recording medium, and an identification information storage unit adapted to store the identification information associated with the identifier.

As an example of the present invention corresponding to still another aspect of the preferred embodiments, a printing apparatus, connected to an information processing apparatus, which manages identification information for identifying data recorded on a recording medium associated with an identifier that is added to the recording medium and enables individually identifying the recording medium, comprises a reading unit adapted to read a first identifier from the recording medium, a transmitter adapted to transmit the first identifier read by the reading unit to the information processing apparatus, a receiver adapted to receive print data transmitted from the information processing apparatus in accordance with transmission of the first identifier, and a printing unit adapted to print in a printable area of the recording medium using the print data.

As an example of the present invention corresponding to still another aspect of the preferred embodiments, an information processing apparatus connectable to a printing apparatus, which prints in a printable area of a recording medium, comprises a storage unit adapted to store identification information for identifying data recorded on the recording medium associated with an identifier that is added to the recording medium and enables individually identifying the recording medium, a search request acceptance unit adapted to accept a search request of first identification information being associated with a first identifier from the connected printing apparatus, and a transmitter adapted, when the first identification information is stored in the storage unit, to transmit print data based on the first identification information to the printing apparatus.

As an example of the present invention corresponding to still another aspect of the preferred embodiments, a printing apparatus, connectable to a recording apparatus which records data on a recording medium, comprises an obtaining unit adapted, when the printing apparatus is connected to the recording apparatus, to obtain, from the recording apparatus, attribute information regarding data recordable on the recording medium, a printing unit adapted to print in a printable area of the recording medium using the attribute information, an identifier reading unit adapted to read, from the recording medium, an identifier capable of individually identifying the recording medium, and a management unit adapted to manage the attribute information associated with the identifier.

As an example of the present invention corresponding to still another aspect of the preferred embodiments, a recording apparatus, which is connectable to a printing apparatus for printing in a printable area of a recording medium, and records data on the recording medium, comprises a data storage unit adapted to store data, a transmission request acceptance unit adapted, when the printing apparatus is connected, to accept, from the printing apparatus, a transmission request of attribute information regarding data to be recorded on the recording medium, a search unit adapted to search in response to the transmission request for data that is stored in the data storage unit and is recordable on the recording medium, and a transmitter adapted to transmit, to the printing apparatus, attribute information regarding the recordable data detected by the search unit.

When the attribute information regarding data recordable on the recording medium is managed, associated with an identifier which is added to the recording medium and enables individually identifying the recording medium, in the connected printing apparatus, the recording apparatus further comprises a reading unit adapted to read a first identifier from the recording medium, a transmission requesting unit adapted to request the printing apparatus to transmit first attribute information being managed, associated with the first identifier, an obtaining unit adapted, when the first attribute information is received from the printing apparatus in response to the request, to obtain data corresponding to the received first attribute information among data stored in the data storage unit, and a recording unit adapted to record the obtained data on a recording medium.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a flowchart showing an example of a label printing processing corresponding to the second embodiment of the present invention;

FIG. 8 is a table showing an example of a metadata table corresponding to the embodiment of the present invention;

DESCRIPTION OF THE EMBODIMENTS

Preferred embodiments of the present invention will now be described in detail in accordance with the accompanying drawings.

[First Embodiment]

Figure 1:
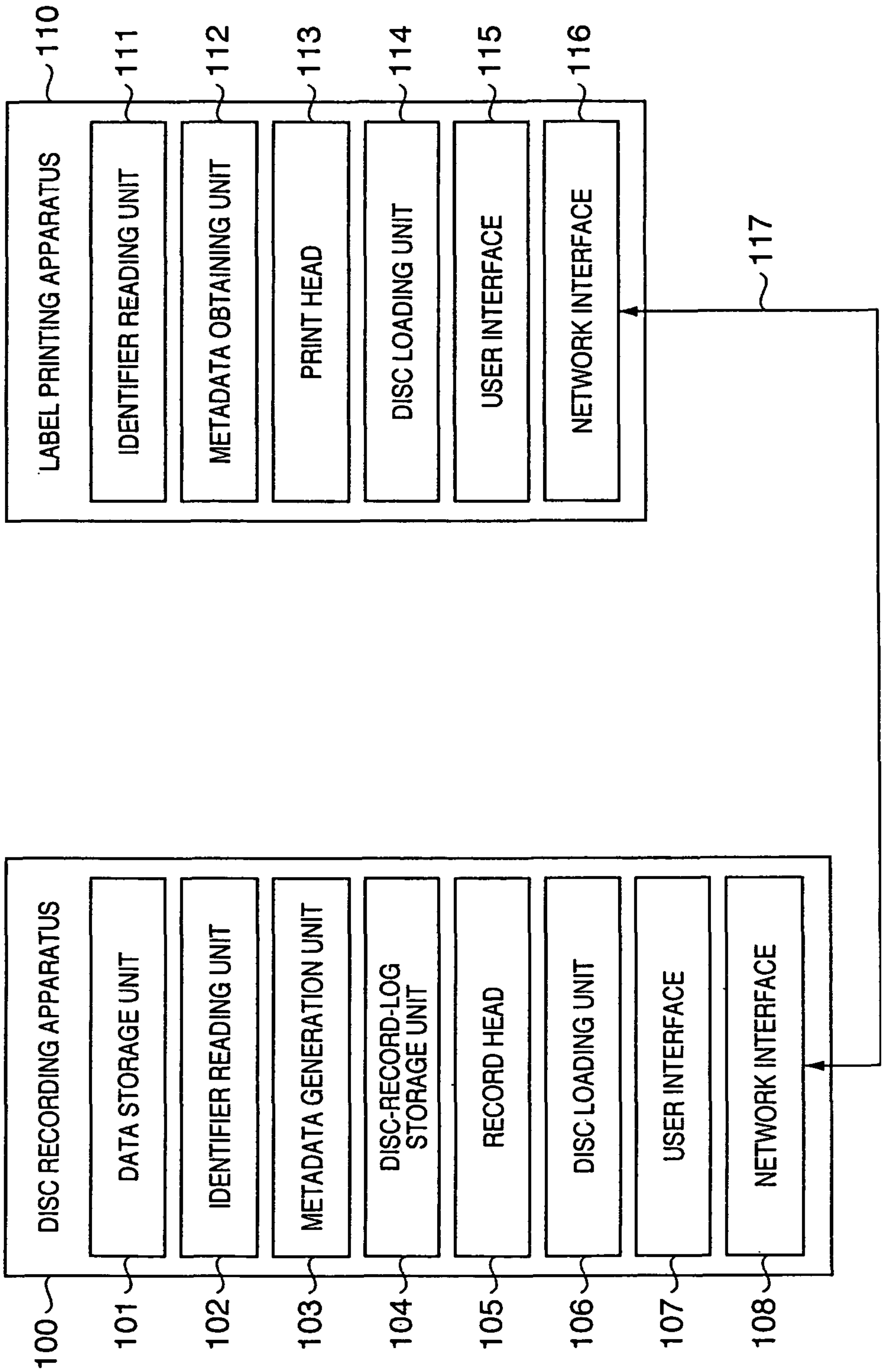
FIG. 1 is a block diagram showing an example of the configuration of a label printing system corresponding to the first embodiment of the present invention.

The first embodiment of the present invention will be described below. FIG. 1 is a block diagram showing an example of the configuration of a label printing system corresponding to the first embodiment.

In FIG. 1, reference numeral 100 denotes a disc recording apparatus, and reference numeral 101, a data storage unit which stores data to be recorded on a disc. The data storage unit 101 stores data and attribute information regarding the data. The attribute information is arbitrary, as long as the information is related to data. The attribute information contains the data name, data type (photograph, document, or table data), data generation date and time, or extension. When data is image data sensed by a digital camera, the photographing date and time, photographing mode, scene extraction image, or the like, can be used as attribute information. One or a combination of pieces of attribute information can be used. In the following embodiments, only the data name is used out of the pieces of attribute information, for descriptive convenience, but other attribute information and a combination of pieces of attribute information can also be used. Reference numeral 102 denotes an identifier reading unit, which reads an identifier (disc identifier) unique to a disc from a disc loaded in a disc recording apparatus 100. Reference numeral 103 denotes a metadata generation unit which reads out attribute information of data recorded on a disc from the data storage unit 101 to generate metadata. In the first embodiment, metadata is identification information for identifying data recorded on a disc.

Reference numeral 104 denotes a disc-record-log storage unit which associates a disc identifier with metadata of data recorded on the disc, and stores and manages them as a metadata table. Reference numeral 105 denotes a record head which records data on a disc. Reference numeral 106 denotes a disc loading unit to which a recording/playback disc is loaded. Reference numeral 107 denotes a user interface which accepts an instruction input from the user of the disc recording apparatus 100. Reference numeral 108 denotes a network interface.

Reference numeral 110 denotes a label printing apparatus, and reference numeral 111, an identifier reading unit which reads a disc identifier by, e.g., an optical means from a disc loaded in the disc loading unit 114 of the label printing apparatus 110. Reference numeral 112 denotes a metadata obtaining unit which obtains metadata from the disc recording apparatus 100 via a network 117. Reference numeral 113 denotes a print head which prints a label on a disc. Reference numeral 114 denotes a disc loading unit to which a recording/playback disc is loaded. Reference numeral 115 denotes a user interface which accepts an instruction input from the user of the label printing apparatus 110.

Reference numeral 116 denotes a network interface. The network 117 connects the disc recording apparatus 100 and label printing apparatus 110. The network 117 may be, e.g., a local area network (LAN) by wired connection, or may connect the two apparatuses by a USB or IEEE1394 cable. The network 117 may also comply with infrared communication, or wireless communication, such as IEEE802.11a/b/g or Bluetooth™. In this manner, the label printing system in the first embodiment is configured by connecting the disc recording apparatus 100 and label printing apparatus 110.

Figure 2:
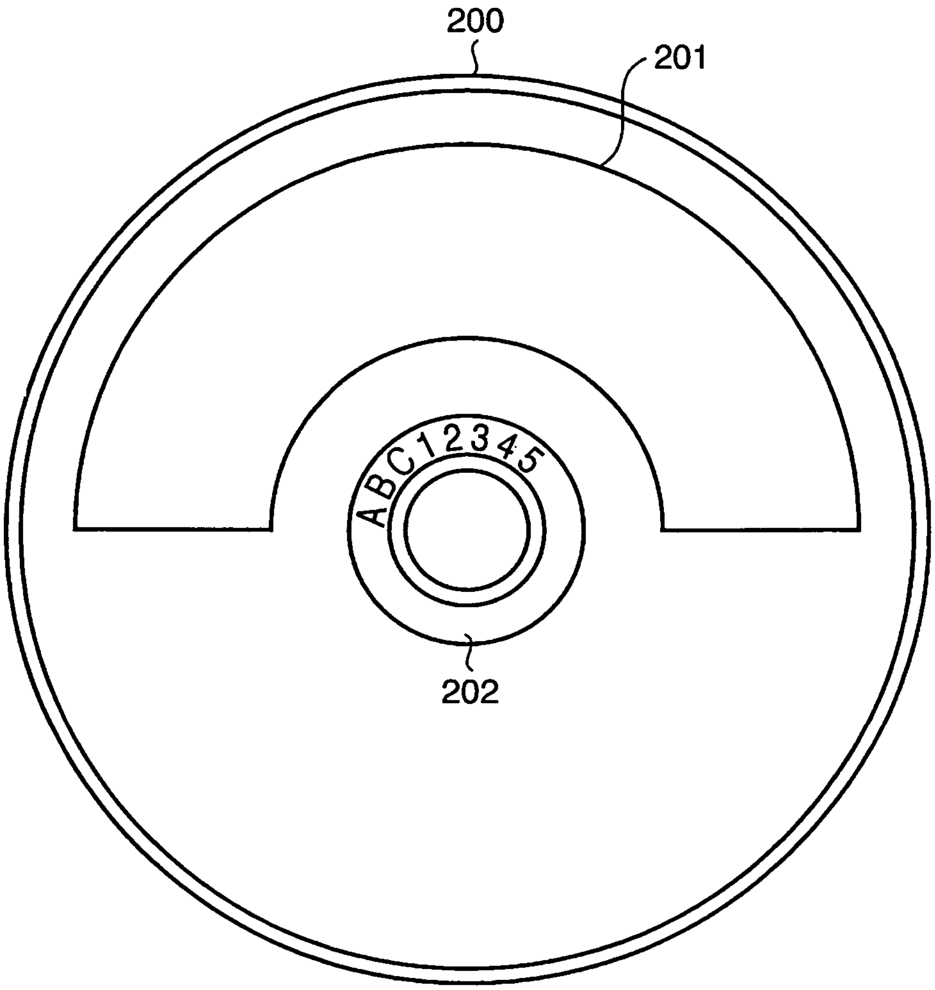
FIG. 2 is a view showing an example of the structure of a disc corresponding to the first embodiment of the present invention.

An example of the structure of a disc according to the first embodiment will be explained with reference to FIG. 2. In FIG. 2, reference numeral 200 denotes an entire disc, and reference numeral 201, a printable area on a disc in which a label can be printed by the label printing apparatus 110. Reference numeral 202 denotes a disc identifier which enables identifying an individual disc. As the disc identifier 202, a character string is described in the first embodiment. The back surface of the disc 200, shown in FIG. 2, serves as an area (recordable area) in which record data can be recorded.

Figure 3:
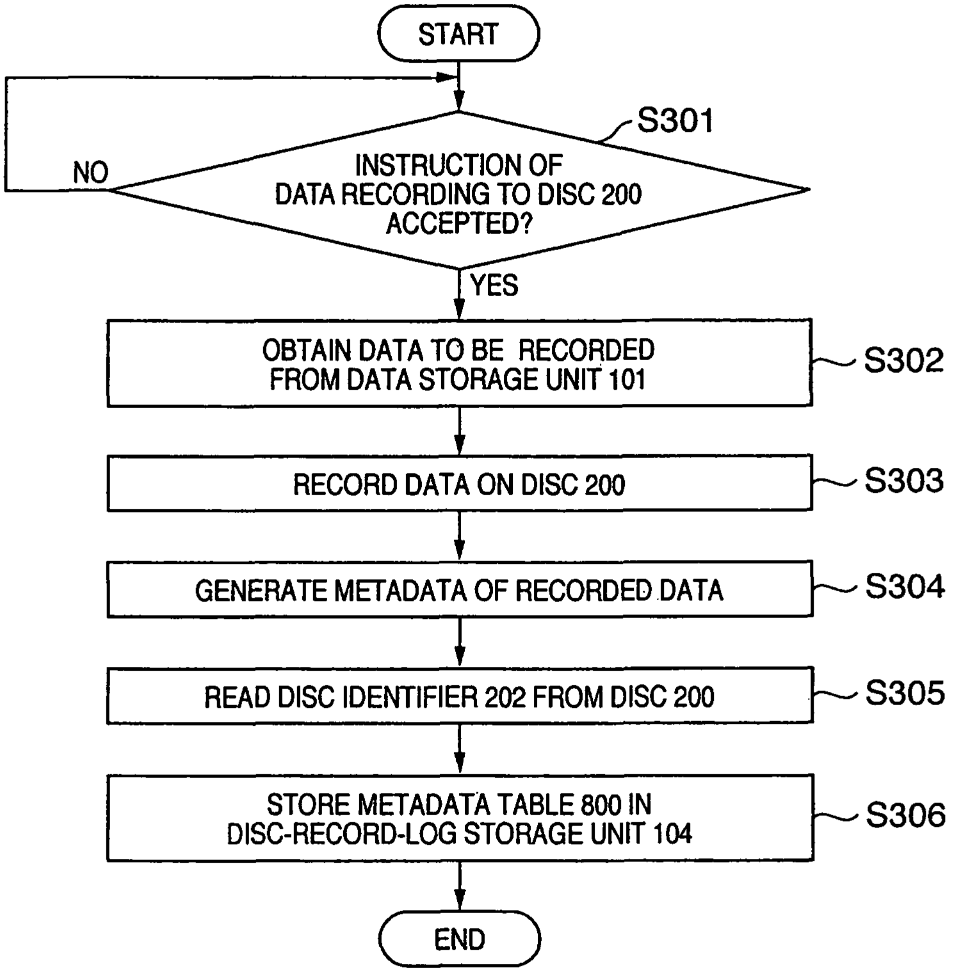
FIG. 3 is a flowchart showing an example of data recording processing corresponding to the first embodiment of the present invention.

An example of data recording processing to the disc 200 by the disc recording apparatus 100 corresponding to the first embodiment will be explained with reference to the flowchart in FIG. 3. In step S301, it is monitored whether a data recording instruction to the disc 200 loaded in the disc loading unit 106 has been accepted from the user via the user interface 107. If the data recording instruction has been accepted ("YES" in step S301), the flow shifts to step S302. If no instruction has been accepted, monitoring continues. In step S302, record data is read out from the data storage unit 101. In step S303, the readout data is recorded on the disc 200 by the record head 105.

In step S304, the metadata generation unit 103 reads out attribute information of recorded data from the data storage unit 101 to generate metadata. The first embodiment employs the data name as metadata. After the metadata is created, the identifier reading unit 102 reads the disc identifier 202 from the disc 200 in step S305. In step S306, the read disc identifier 202 and the metadata generated by the metadata generation unit 103 are stored as a metadata table in correspondence with each other in the disc-record-log storage unit 104. An example of the metadata table is shown in FIG. 8. In FIG. 8, reference numeral 800 denotes an entire metadata table. In a column 801, the data name is registered as metadata. Note that when a plurality of data are recorded and, thus, a plurality of data names exist, the data are registered by separating the data names from each other. All or some data names may be registered in the attribute information table. After that, the data recording processing ends.

Figure 4:
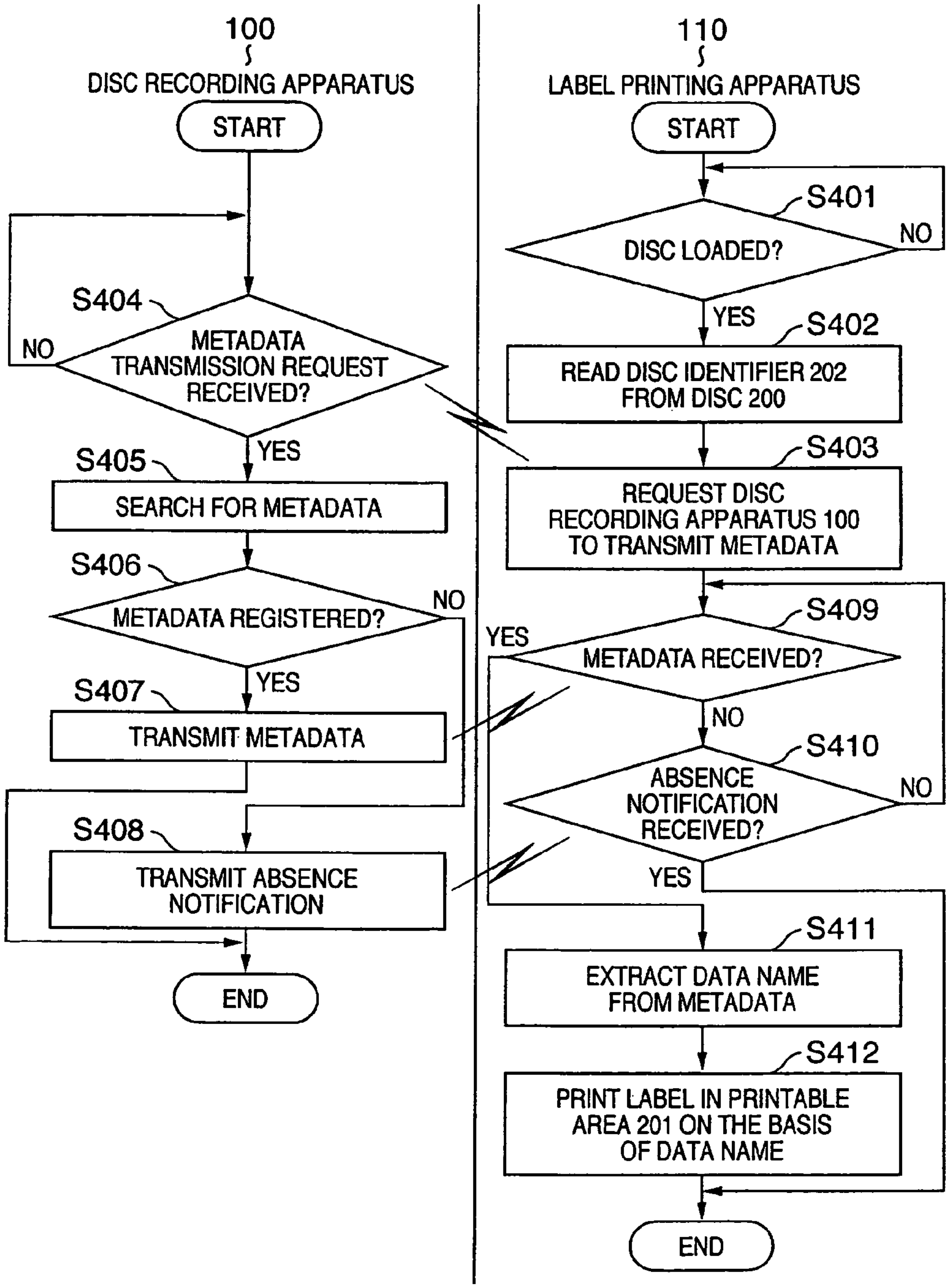
FIG. 4 is a flowchart showing an example of label printing processing corresponding to the first embodiment of the present invention.

An example of label printing processing corresponding to the first embodiment will be explained with reference to the flowchart in FIG. 4. In step S401, the label printing apparatus 110 monitors whether the disc 200 is loaded in the disc loading unit 114. If loading of the disc is detected ("YES" in step S401), the flow shifts to step S402. In step S402, the disc identifier 202 of the disc 200 loaded in the disc loading unit 114 is read by the identifier reading unit 111. In step S403, the read disc identifier 202 is transferred to the metadata obtaining unit 112. The metadata obtaining unit 112 requests the disc recording apparatus 100, via the network 117, to transmit metadata corresponding to the disc identifier 202 stored in the disc-record-log storage unit 104.

At this time, in step S404, the disc recording apparatus 100 monitors whether it has received the metadata transmission request. If the received request has been received ("YES" in step S404), the flow shifts to step S405. In step S405, it is determined whether metadata corresponding to the disc identifier 202 contained in the transmission request is registered in the metadata table 800 in the disc-record-log storage unit 104. If the metadata is registered ("YES" in step S406), the flow shifts to step S407 to transmit the metadata to the label printing apparatus 110 via the network 117, and the processing ends. If no metadata is registered ("NO" in step S406), the disc recording apparatus 100 transmits, to the label printing apparatus 110 in step S408, a notification (absence notification) that no metadata corresponding to the transmitted disc identifier 202 exists. Then, the processing ends.

In step S409, the label printing apparatus 110 monitors whether it has received the metadata corresponding to the transmission request. If no metadata has been received ("NO" in step S409), the flow shifts to step S410. In step S410, it is determined whether the absence notification has been received. If no absence notification has been received ("NO" in step S410), the flow returns to step S409. If the absence notification has been received ("YES" in step S410), the processing ends. If the metadata has been received ("YES" in step S409), the flow shifts to step S411. In step S411, the metadata obtaining unit 112 extracts the data name of data recorded on the disc 200 from the received metadata. In step S412, the print head 113 prints a label in the printable area 201 on the basis of the extracted data name. When a plurality of data names exist, they are printed, so that the user can recognize breaks between them. It is also possible to prompt the user via the user interface to select a data name to be printed.

As described above, the label printing apparatus corresponding to the first embodiment can request, of the disc recording apparatus, metadata of data recorded on a disc on the basis of a disc identifier for identifying an individual disc, and can print a label based on the metadata. The user of the label printing apparatus need neither determine the contents of a disc on their own nor create a label. At the same time, a label which matches contents in a disc can be easily printed.

[Second Embodiment]

The second embodiment of the present invention will be described below.

In the first embodiment, the disc-record-log storage unit 104 is incorporated in the disc recording apparatus 100. In the second embodiment, a disc-record-log storage unit 104 and disc recording apparatus 100 are independent of each other.

Figure 5:
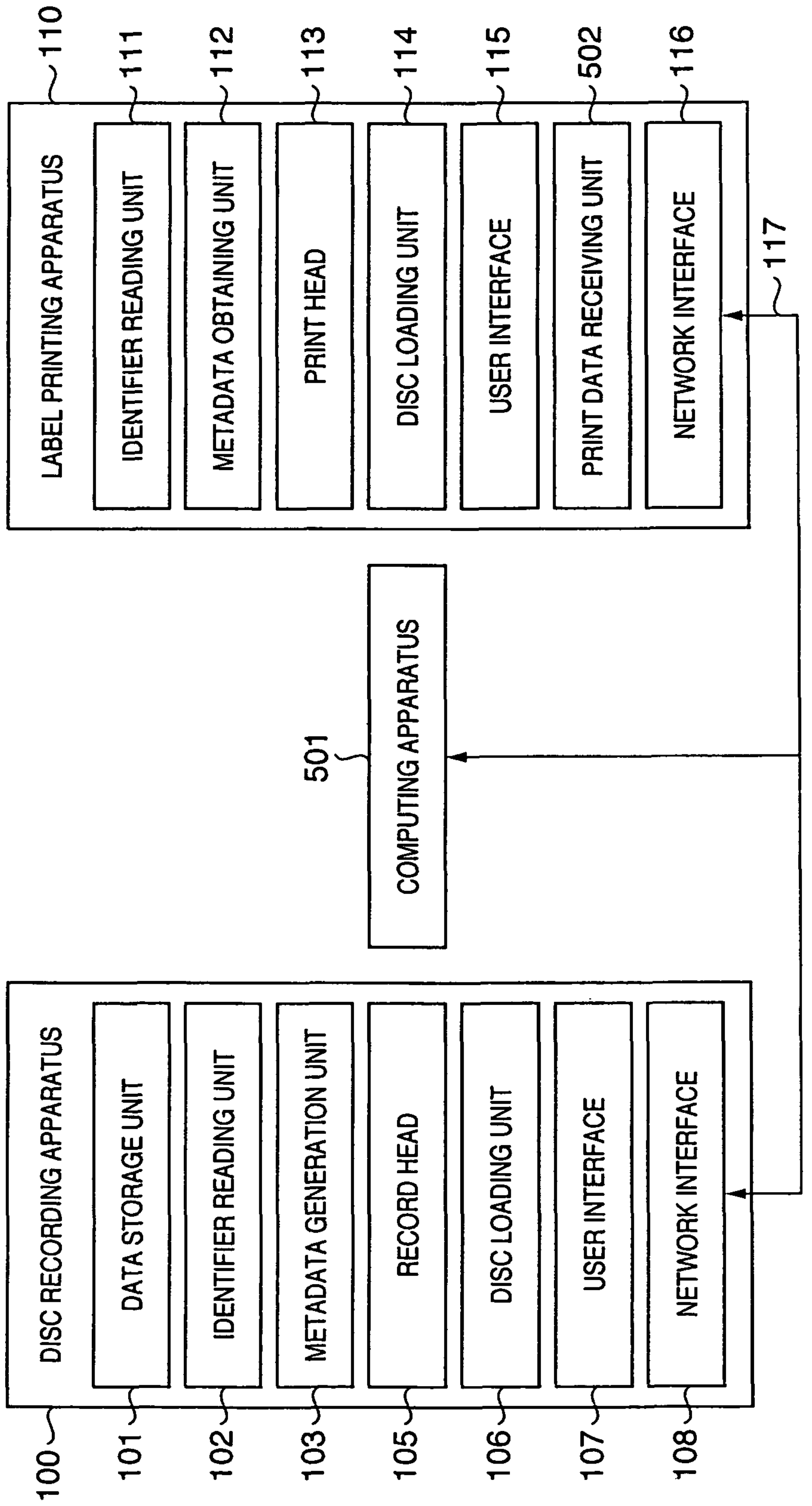
FIG. 5 is a block diagram showing an example of the configuration of a label printing system corresponding to the second embodiment of the present invention.

FIG. 5 shows an example of the configuration of a system corresponding to the second embodiment. The configuration in FIG. 5 is different from that in FIG. 1 in that no disc-record-log storage unit 104 exists in the disc recording apparatus 100, and a computing apparatus 501 and print data receiving unit 502 exist. The same reference numerals denote building components common in FIGS. 1 and 5, the functions of these components have been described in the first embodiment, and a detailed description thereof will be omitted.

In the second embodiment, the computing apparatus 501 can be formed from a general-purpose personal computer, and has at least the function of the disc-record-log storage unit 104 in the first embodiment. The computing apparatus 501 controls the operations of the disc recording apparatus 100 and a label printing apparatus 110. The print data receiving unit 502 receives print data used for printing by a print head 113 from the computing apparatus 501.

Figure 6:
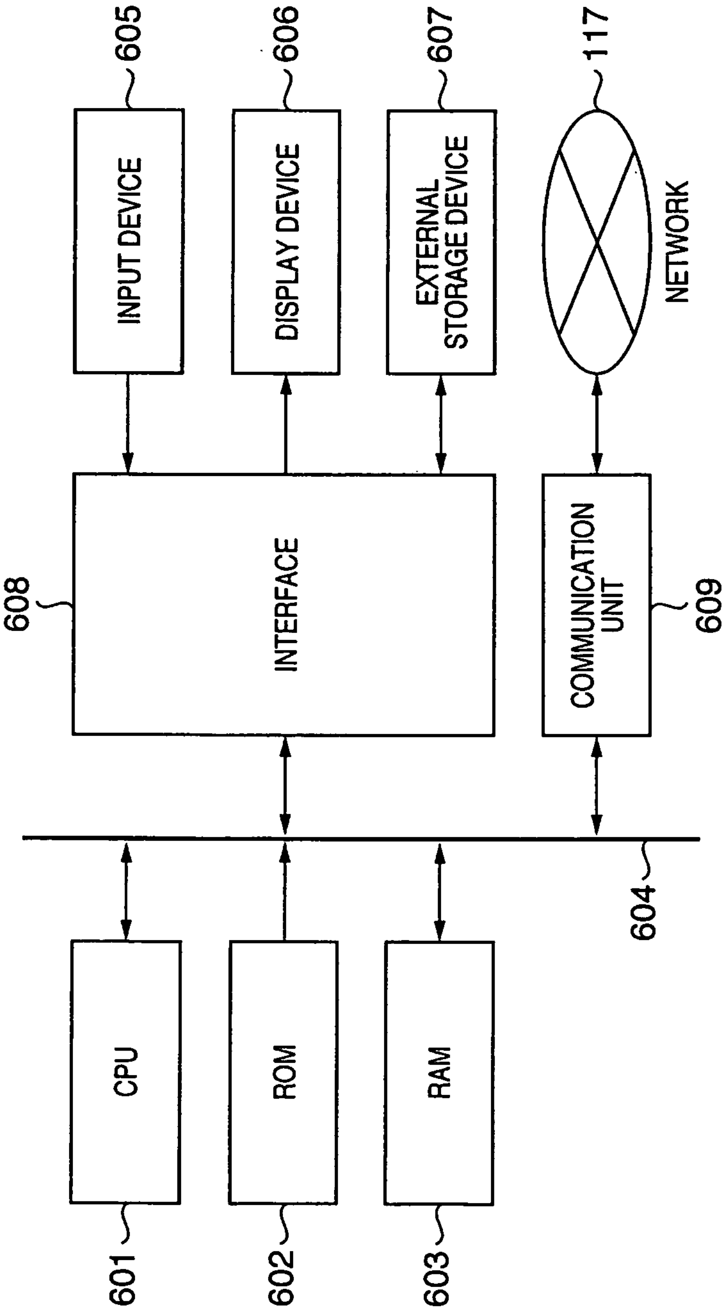
FIG. 6 is a block diagram showing an example of the configuration of a computing apparatus 501 corresponding to the second embodiment of the present invention.

FIG. 6 shows an example of the configuration of the computing apparatus 501. In FIG. 6, reference numeral 601 denotes a CPU, which executes an OS (Operating System) and various application programs, and controls the respective units of the computing apparatus 501. Reference numeral 602 denotes a ROM, which stores permanent data out of programs executed by the CPU 601 and arithmetic parameters. Reference numeral 603 denotes a RAM, which provides a work area for the CPU 601 and a temporary storage area of data. Reference numeral 604 denotes a bus, which connects the CPU 601, the ROM 602, the RAM 603, an interface 608, and a communication unit 609 to each other.

Reference numeral 605 denotes an input device, such as a keyboard. Reference numeral 606 denotes a display device which is formed from a CRT, a liquid crystal display, or the like. Reference numeral 607 denotes an external storage device, which is formed from a hard disk, MO, CD-ROM, DVD-ROM, or the like, and stores at least label template data and a metadata table 800. The interface 608 enables communication between the input device 605, the display device 606, the external storage device 607, and the bus 604. The communication unit 609 enables connection of the computing apparatus 501 to a network 117.

An example of label printing processing in the second embodiment will be explained with reference to the flowchart in FIG. 7. Note that data recording processing to a disc 200 can be executed similarly to processing shown in FIG. 3 in the first embodiment, and a detailed description thereof will be omitted. In the second embodiment, however, the metadata table 800 generated in step S306 is stored, not in the disc recording apparatus 100, but in the external storage device 607 in the computing apparatus 501.

In step S701 of FIG. 7, the computing apparatus 501 accepts a label printing instruction from the user. If the label printing instruction is accepted ("YES" in step S701), the flow shifts to step S702. In step S702, the computing apparatus 501 notifies the label printing apparatus 110 of a label printing instruction via the network 117.

In step S703, the label printing apparatus 110 monitors whether it has accepted the label printing instruction from the computing apparatus 501. If the instruction has been accepted ("YES" in step S703), the flow shifts to step S704 to determined whether the disc 200 is loaded in a disc loading unit 114. If loading of the disc is detected ("YES" in step S704), the flow shifts to step S705. In step S705, a disc identifier 202 of the disc 200, loaded in the disc loading unit 114, is read by an identifier reading unit 111. In step S706, the read disc identifier 202 is transferred to a metadata obtaining unit 112, and a request to search for metadata corresponding to the disc identifier 202 is transmitted to the computing apparatus 501.

In step S707, the computing apparatus 501 monitors whether it has received the metadata search request from the label printing apparatus 110. If the metadata search request has been received ("YES" in step S707), the flow shifts to step S708. In step S708, it is determined whether the metadata is registered in the metadata table 800 stored in the external storage device 607 in correspondence with the disc identifier 202 contained in the metadata search request. If the metadata corresponding to the disc identifier 202 is registered ("YES" in step S709), the flow shifts to step S710. If no metadata is registered ("NO" in step S709), the flow shifts to step S711. In step S710, the data name is extracted from the metadata, and displayed on the display device 606. In step S711, a message that no metadata has been stored is displayed, and the processing ends.

In step S712, a print start instruction from a user who confirmed display of the data name on the display device 606 is accepted. If the print start instruction is accepted from the user via the input device 605 ("YES" in step S712), the flow shifts to step S713 to transmit print data for label printing to the label printing apparatus 110.

In step S714, the label printing apparatus 110 monitors whether the print data receiving unit 502 has received the print data from the computing apparatus 501. If the print data has been received ("YES" in step S714), the flow shifts to step S715. In step S715, a label is printed in a printable area 201 of the disc 200 using the received print data, and the processing ends.

In processing of step S710, not only can the data name be confirmed, but also, a plurality of samples prepared by applying the data name to label templates stored in the external storage device 607 can be displayed. The user can select a favorite one of the displayed samples and designate the start of printing. That is, by displaying label templates, the user can designate the start of label printing using a desired template.

As has been described above, the label printing apparatus corresponding to the second embodiment can receive print data for label printing from the computing apparatus on the basis of a disc identifier for identifying an individual disc, and can print a label. The user of the label printing apparatus need neither determine the contents of a disc on his own nor create a label. At the same time, a label which matches contents in a disc can be easily printed.

In the above embodiments, building components which form the disc recording apparatus 100 and label printing apparatus 110 exist in the respective apparatuses. However, the configuration of each apparatus is merely an example, and the present invention is not limited to this arrangement. For example, some of the building components of the apparatus may be distributed in a computer, a processing terminal, and the like, distributed on a network.

In the above embodiments, a character string is described as a disc identifier, but one or a combination of a barcode, a magnetic tape, a wireless tag (RFID tag), a hologram, and the like, may be used. Even when a combination of disc identifiers is used, and the respective disc identifiers have different pieces of recognition information, the present invention can be practiced by managing the correspondence between the pieces of recognition information. In this case, the identifier reading unit 111 of the label printing apparatus 100 comprises a reading means corresponding to a barcode reader, a magnetic head, or the like.

The above embodiments assume that the disc identifier is added on the printable side of the disc separately from data recording. However, the disc identifier can also be recorded by the disc recording apparatus 100 using the recordable side of the disc separately from record data. In this case, the label printing apparatus 110 preferably comprises an identifier reading unit for reading a disc identifier from at least an area in which the disc identifier is recorded by the disc recording apparatus on the recordable side of the disc.

A preferable example of the recording apparatus in practicing the present invention is a camcorder. In this case, recording media, such as a DV tape and a memory card, are also available, in addition to a disc recording medium, such as a DVD-R. At this time, for example, the photographing date and time, photographing mode, scene extraction image, or the like, can be used as metadata.

Another preferable example of the recording apparatus in practicing the present invention is a DVD recorder. In this case, a recordable DVD is available as a recording medium. Attribute information of record data available as metadata can contain part of or all of EPG (Electronic Program Guide) data.

[Third Embodiment]

Figure 9:
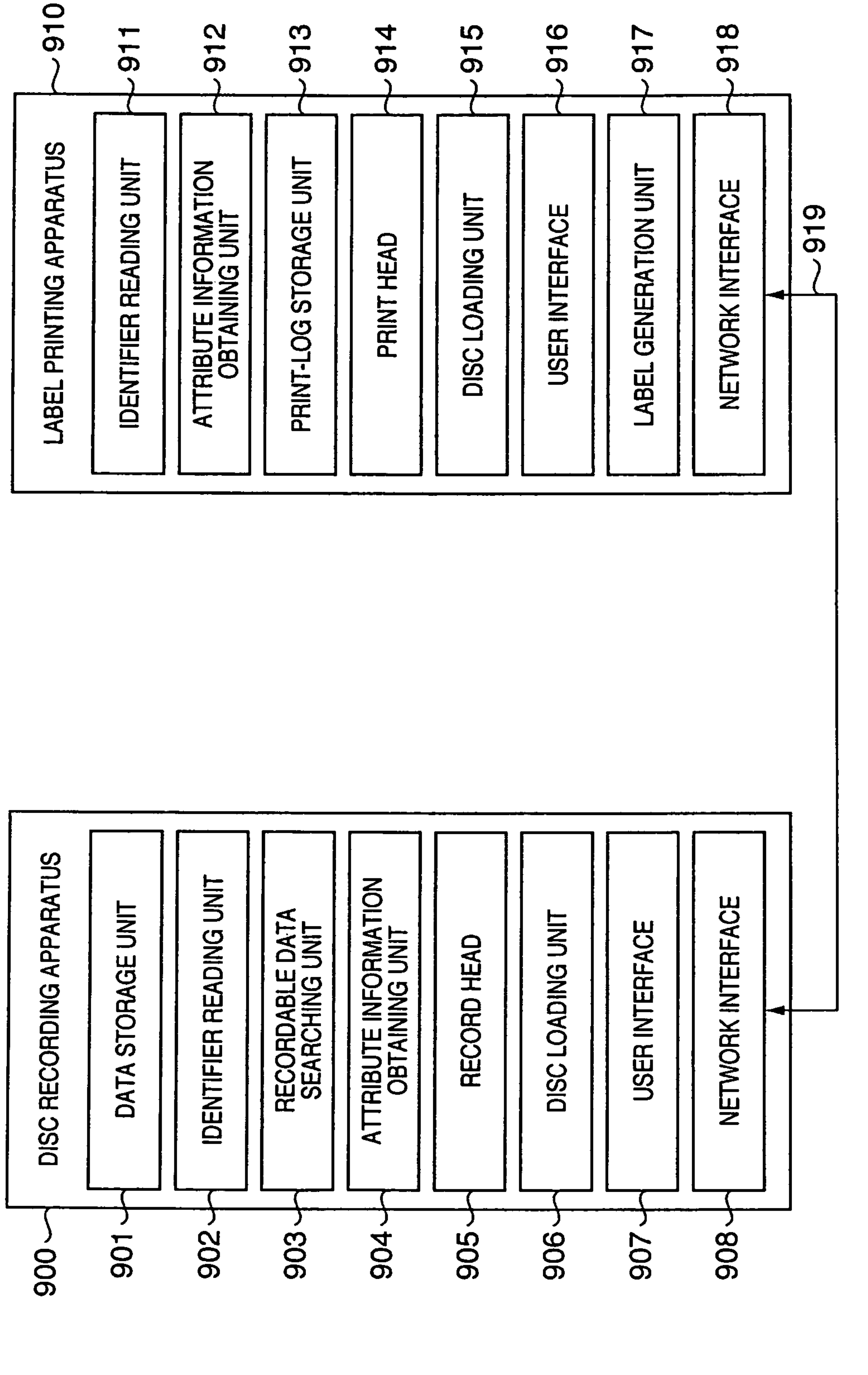
FIG. 9 is a block diagram showing an example of the configuration of a label printing system corresponding to the third embodiment of the present invention.

FIG. 9 is a block diagram showing an example of the configuration of a system which practices an invention according to the third embodiment. Reference numeral 900 denotes a disc recording apparatus, and reference numeral 901, a data storage unit which stores data to be recorded on a disc. The data storage unit 901 is formed from a hard disk, or the like. Note that the data contains attribute information regarding the data. The contents of the attribute information are the same as those described in the first and second embodiments. In the following description, only the data name is used out of the pieces of attribute information for descriptive convenience, but other attribute information and a combination of pieces of attribute information can also be used.

Reference numeral 902 denotes an identifier reading unit which reads an identifier (disc identifier) unique to a disc by, e.g., an optical means from a disc loaded in the disc recording apparatus 900. Reference numeral 903 denotes a recordable data searching unit which searches data stored in the data storage unit 901 for data recordable on a disc. Reference numeral 904 denotes an attribute information obtaining unit which requests a label printing apparatus 910 to obtain attribute information necessary to specify data to be recorded on a loaded disc. Reference numeral 905 denotes a record head which records data on a disc. Reference numeral 906 denotes a disc loading unit to which a recording/playback disc is loaded. Reference numeral 907 denotes a user interface which accepts an instruction input from the user of the disc recording apparatus 900. Note that the user interface 907 includes a display unit for displaying a predetermined window. Reference numeral 908 denotes a network interface.

Reference numeral 910 denotes the label printing apparatus, and reference numeral 911, an identifier reading unit which reads a disc identifier by, e.g., an optical means from a disc loaded into the label printing apparatus 910. Reference numeral 912 denotes an attribute information obtaining unit which requests the disc recording apparatus 900 to obtain attribute information necessary to print a label. Reference numeral 913 denotes a print-log storage unit which associates the disc identifier of a disc on which a label is printed, with attribute information used to print the label, and stores and manages them as an attribute information table. Reference numeral 914 denotes a print head which prints a label on a disc.

Reference numeral 915 denotes a disc loading unit to which a recording/playback disc is loaded. Reference numeral 916 denotes a user interface which accepts an instruction input from the user of the label printing apparatus 910. Reference numeral 917 denotes a label generation unit which stores template data for disc label printing and generates print label data on the basis of the template data.

Reference numeral 918 denotes a network interface, and reference numeral 919, a network which connects the disc recording apparatus 900 and label printing apparatus 910. The network 919 may be, e.g., a local area network (LAN) by wired connection, or may connect the two apparatuses by a USB or IEEE1394 cable. The network 919 may also comply with infrared communication, or wireless communication such as IEEE802.11a/b/g or Bluetooth™. In this way, the label printing system in the third embodiment is configured by connecting the disc recording apparatus 900 and label printing apparatus 910.

An example of the structure of a disc corresponding to the third embodiment is the same as that shown in FIG. 2.

An example of label printing processing corresponding to the third embodiment will be explained with reference to the flowchart in FIG. 10. In step S1001, the label printing apparatus 910 monitors whether a disc 200 is loaded in the disc loading unit 915, and a label printing instruction has been accepted form the user via the user interface 916. If the label printing instruction has been accepted ("YES" in step S1001), the flow shifts to step S1002. In step S1002, the attribute information obtaining unit 912 requests the disc recording apparatus 900, via the network interface 918, to transmit attribute information.

In step S1003, the disc recording apparatus 900 monitors whether it has received the attribute information transmission request from the label printing apparatus 910. If the transmission request has been received ("YES" in step S1003), the flow shifts to step S1004. In step S1004, the recordable data searching unit 903 searches the data storage unit 901 for data recordable on the disc 200 in response to the attribute information transmission request. If recordable data is found as a result of the search ("YES" in step S1005), the flow shifts to step S1006. If no recordable data is found ("NO" in step S1005), the flow shifts to step S1007.

In step S1003, the disc recording apparatus 900 monitors whether it has received the attribute information transmission request from the label printing apparatus 910. If the transmission request has been received ("YES" in step S1003), the flow shifts to step S1004. In step S1004, the recordable data searching unit 903 searches the data storage unit 901 for data recordable on the disc 200 in response to the attribute information transmission request. If recordable data is found as a result of the search ("YES" in step S1005), the flow shifts to step S1006. If no recordable data is found ("NO" in step S1005), the flow shifts to step S1007.

In step S1006, the recordable data searching unit 903 obtains, from the data storage unit 901, attribute information of the data, which is determined to be recordable, and transmits the attribute information to the label printing apparatus 910 via the network interface 908. In step S1007, a data absence notification that no recordable data exists is transmitted. Thereafter, the processing ends.

In step S1008, the label printing apparatus 910 monitors whether it has received the attribute information transmitted from the disc recording apparatus 900. If the attribute information has been received ("YES" in step S1008), the flow shifts to step S1010. If no attribute information has been received ("NO" in step S1008), the flow shifts to step S1009 to determine whether the data absence notification has been received. If the data absence notification has been received ("YES" in step S1009), the processing ends. At this time, a predetermined error message may be displayed. If no data absence notification has been received ("NO" in step S1009), the flow returns to step S1008.

In step S1010, the label generation unit 917 generates a print label on the basis of the received/obtained attribute information. The label can be generated by combining text information based on attribute information with label printing template data stored in advance in the label generation unit 917. In step S1011, the generated label is printed by the print head 914 in a printable area 201 of the disc 200.

In step S1012, the identifier reading unit 911 reads a disc identifier 202 of the label-printed disc 200. When the disc identifier 202 is not added to the disc 200 in advance or cannot be read, the disc identifier 202 may be newly printed using the print head 914. In this case, the disc identifier 202 can be printed in the printable area 201 of the disc 200 or an inner peripheral area of the disc 200, in which the disc identifier 202 should be added. In step S1013, the disc identifier 202, read in step S1012, and the attribute information, received from the disc recording apparatus 900 in step S1008, are associated with each other, and stored as an attribute information table in the print-log storage unit 913. Note that when the disc identifier 202 is printed using the print head 914, the printed disc identifier 202 is registered in the attribute information table.

An example of the attribute information table in the third embodiment is substantially the same as that shown in FIG. 8 described above. However, the item name "metadata" of item 802 in FIG. 8 changes to "attribute information" in the third embodiment, and attribute information is registered as item

802. In the following description, the table in FIG. 8 will be called an "attribute information table 800". After that, the label printing processing by the label printing apparatus 910 ends.

An example of data recording processing to the disc 200 corresponding to the third embodiment will be explained with reference to the flowchart in FIG. 11.

Figure 11:
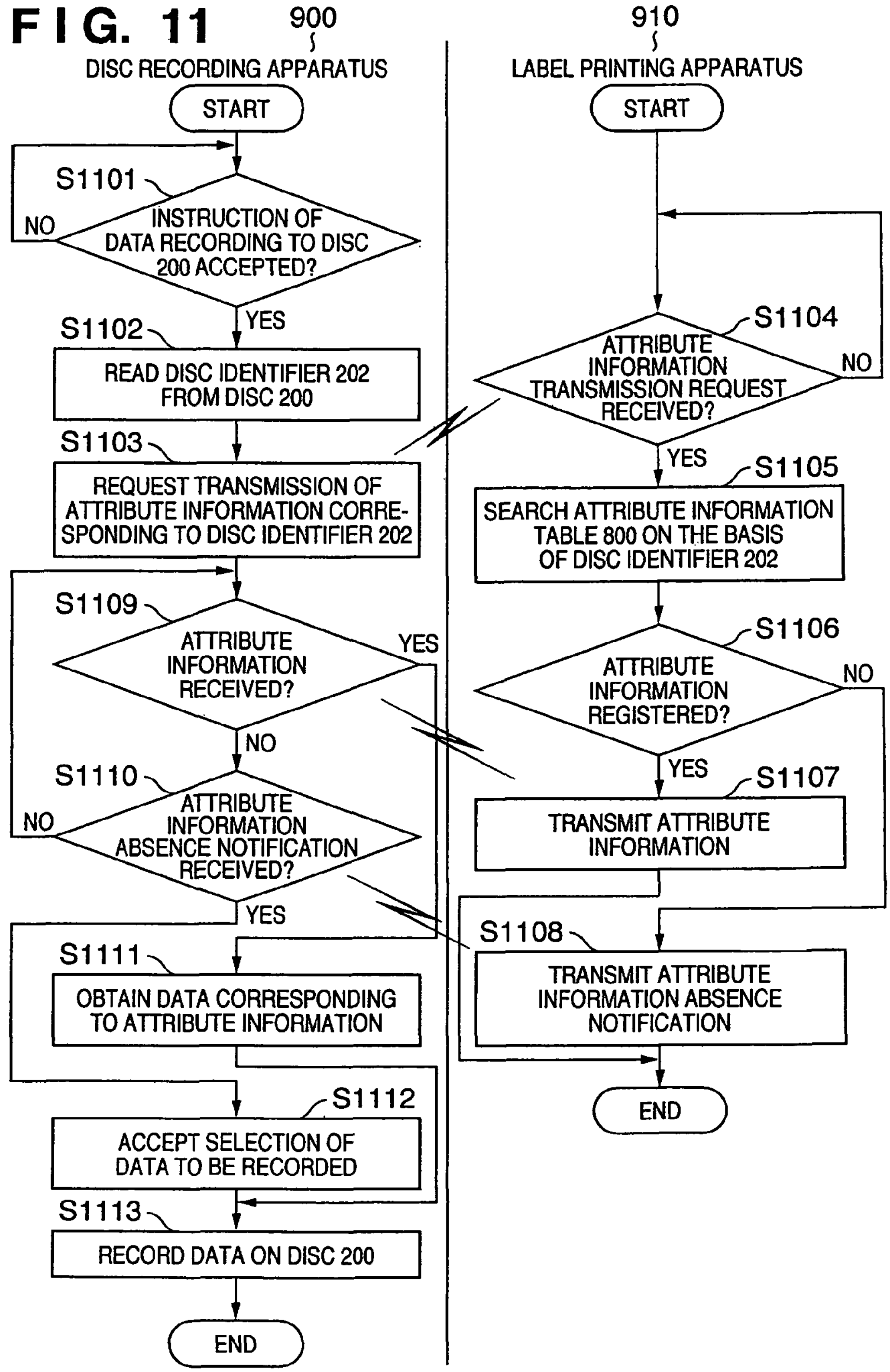
FIG. 11 is a flowchart showing an example of data recording processing corresponding to the third embodiment of the present invention.

In step S1101 of FIG. 11, it is monitored whether a data recording instruction to the disc 200 loaded in the disc loading unit 906 has been accepted from the user via the user interface 907. If the instruction has been accepted ("YES" in step S1101), the flow shifts to step S1102. In step S1102, the identifier reading unit 902 reads the disc identifier 202 from the disc 200. In step S1103, the attribute information obtaining unit 904 requests the label printing apparatus 910 to transmit attribute information corresponding to the obtained disc identifier 202. Transmission of the attribute information is requested when attribute information associated with the disc identifier 202 of the disc 200, currently loaded in the disc loading unit 906, is stored in the print-log storage unit 913 of the label printing apparatus 910.

In step S1104, the label printing apparatus 910 monitors whether it has received the attribute information transmission request from the disc recording apparatus 900. If the transmission request has been received ("YES" in step S1104), the flow shifts to step S1105. In step S1105, the attribute information table 800 in the print-log storage unit 913 is searched on the basis of the disc identifier 202 contained in the transmission request. If attribute information corresponding to the disc identifier 202 is registered in the attribute information table 800 ("YES" in step S1106), the flow shifts to step S1107. If no attribute information is registered in the attribute information table 800 ("NO" in step S1106), the flow shifts to step S1108.

In step S1107, the attribute information registered in the attribute information table 800 is transmitted to the disc recording apparatus 900. In step S1108, an attribute information absence notification that no attribute information is registered is transmitted to the disc recording apparatus 900.

In step S1109, the disc recording apparatus 900 monitors whether it has received the attribute information from the label printing apparatus 910. If the attribute information has been received ("YES" in step S1109), the flow shifts to step S1111. In step S1111, record data corresponding to the received attribute information is obtained from the data storage unit 901, and the flow shifts to step S1113.

If no attribute information has been received ("NO" in step S1109), the flow shifts to step S1110 to determine whether the attribute information absence notification has been received. If no attribute information absence notification has been received ("NO" in step S1110), the flow returns to step S1109. If the attribute information absence notification has been received ("YES" in step S1110), the flow advances to step S1112. Reception of the attribute information absence notification means that a label, which limits data to be recorded, is not printed on the disc 200. Thus, in step S1112, a list of data stored in the data storage unit 901 is displayed on the display portion of the user interface 907 to accept selection of data to be recorded on the disc 200. After data selection is accepted, the flow shifts to step S1113.

In step S1113, the data obtained in step S1111 or the data selected in step S1112 is recorded in the recordable area of the disc 200, and the processing ends.

Figure 10:
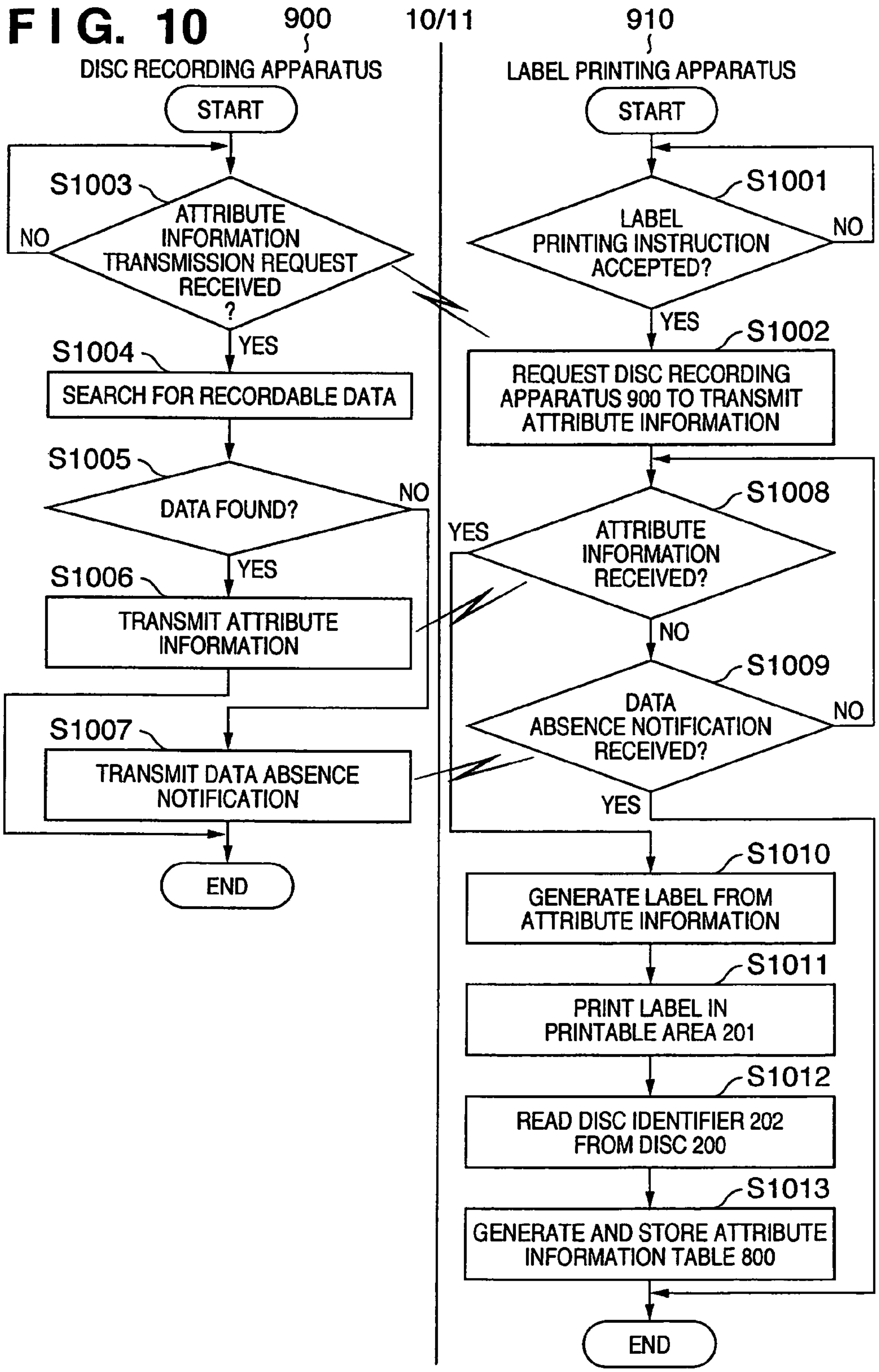
FIG. 10 is a flowchart showing an example of label printing processing corresponding to the third embodiment of the present invention.

In the above embodiment, the recordable data searching unit 903 searches for recordable data in step S1004 of FIG. 10. However, the present invention is not limited to this embodiment, and can take another form.

For example, a list of data stored in the data storage unit 901 may be displayed on the user interface 907 to accept selection of data to be recorded from the user.

Even when the recordable data searching unit 903 searches for recordable data, data which meets a predetermined condition may be selected from a plurality of recordable data stored in the data storage unit 901. As the data selection condition, the creation date and time order, data name dictionary order, data access time order, and the like, are available. However, the present invention is not limited to these conditions, and the use of another condition also falls within the scope of the present invention.

In step S1101 of FIG. 11, a recording operation to the disc 200 starts on the basis of whether a data recording instruction has been accepted. However, it is also possible to detect loading of the disc 200 in the disc loading unit 906, and when the disc is recordable (e.g., a blank medium), to start processing from step S1102, regardless of whether the instruction has been accepted. When the label printing apparatus 910 prints a label in advance on the basis of attribute information, corresponding data can be automatically recorded. To the contrary, when no label is printed, the user can select record data and record the data.

In the above embodiment, building components which form the disc recording apparatus 900 and label printing apparatus 910 exist in the respective apparatuses. However, the configuration of each apparatus is merely an example, and the present invention is not limited to this. For example, some of the building components of the apparatus may be distributed in a computer, a processing terminal, and the like, distributed on a network.

In the above embodiment, a character string is described as a disc identifier, but one or a combination of a barcode, a magnetic tape, a wireless tag, a hologram, and the like, may be used. Even when a combination of disc identifiers is used, and the respective disc identifiers have different pieces of recognition information, the present invention can be practiced by managing the correspondence between the pieces of recognition information. In this case, the identifier reading unit 902 of the disc recording apparatus 900 or the identifier reading unit 911 of the label printing apparatus 910 comprises a reading means corresponding to a barcode reader, a magnetic head, or the like.

The above embodiment assumes that the disc identifier is added on the printable side of the disc separately from data recording. However, the disc identifier can also be recorded by the disc recording apparatus 900 using the recordable side of the disc separately from record data. In this case, the label printing apparatus 910 preferably comprises an identifier reading unit for reading a disc identifier from at least an area in which the disc identifier is recorded by the disc recording apparatus on the recordable side of the disc.

Another preferable example of the recording apparatus in practicing the present invention is a DVD recorder. In this case, a recordable DVD is available as a recording medium. Attribute information of record data available as metadata can contain part of or all of EPG (Electronic Program Guide) data.

The data storage unit 901 in the above embodiment can be implemented as a camcorder. More specifically, a camcorder which receives recording media, such as a magnetic tape having undergone photographing, and can read out data saved in the media, is available as the data storage unit. This will be explained by exemplifying a case wherein the camcorder is combined with the DVD recorder and data is copied from a magnetic tape to a DVD medium, to print a label on the DVD medium.

Label printing processing corresponding to FIG. 10 will be explained. If the label printing apparatus 910 issues an attribute information transmission request to the DVD recorder serving as the disc recording apparatus 900 (step S1002), the DVD recorder receives the request (step S1003), and transfers the transmission request to the camcorder in step S1004. The camcorder reads attribute information of data saved in a loaded tape, and transmits the attribute information to the DVD recorder. The DVD recorder further transmits the received attribute information to the label printing apparatus 910 (step S1006). By using the received attribute information, the data storage unit 901 prints a label on a DVD medium serving as a recording medium, and, at the same time, creates the attribute information table 800 (steps S1010 to S1013).

Data recording processing corresponding to FIG. 11 will be explained. If the user designates data recording on a label-printed DVD medium (step S1101), the DVD recorder obtains the disc identifier 202 from the loaded DVD medium (step S1102). On the basis of the disc identifier 202, the DVD recorder requests the label printing apparatus 910 to transmit attribute information (step S1103). The label printing apparatus 910 transmits attribute information used for label printing (step S1107), and the DVD recorder receives it (step S1109). In processing of step S1111, the DVD recorder transfers the received attribute information to the camcorder, which transmits corresponding data to the DVD recorder. In step S1113, the data can be recorded on the DVD medium on the basis of the data transmitted from the camcorder.

As described above, according to the third embodiment, when a label is to be printed prior to recording of data on a recording medium, a label based on attribute information of data to be recorded later can be generated and printed. In recording data on the label-printed recording medium, the disc recording apparatus 900 and label printing apparatus 910 can communicate with each other to automatically specify data corresponding to the printed label, without any selection operation by the user. Hence, the label printed by the label printing apparatus 910 and data recorded by the disc recording apparatus 900 can reliably match each other. This saves the user from making the label and data match each other, improving user friendliness of label printing.

When no label is printed, the user can select and record arbitrary data. Hence, even if a label is printed later (or is not printed), a recording operation on a recording medium is not limited.

[Other Embodiment]

Note that the present invention can be applied to an apparatus comprising a single device or to a system constituted by a plurality of devices.

Furthermore, the invention can be implemented by supplying a software program, which implements the functions of the foregoing embodiments, directly or indirectly, to a system or an apparatus, reading the supplied program code with a computer of the system or apparatus, and then, executing the program code. In this case, as long as the system or apparatus has the functions of the program, the mode of implementation need not rely upon a program.

Accordingly, since the functions of the present invention are implemented by a computer, the program code installed in the computer also implements the present invention. In other words, the claims of the present invention also cover a computer program for the purpose of implementing the functions of the present invention.

In this case, as long as the system or apparatus has the functions of the program, the program may be executed in any form, such as an object code, a program executed by an interpreter, or script data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM, DVD-R or DVD-RW).

As for the method of supplying the program, a client computer can be connected to a website on the Internet using a browser of the client computer, and the computer program of the present invention or an automatically-installable compressed file of the program can be downloaded to a recording medium, such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and to store the program of the present invention on a storage medium, such as a CD-ROM, to distribute the storage medium to users, to allow users who meet certain requirements to download decryption key information from a website via the Internet, and to allow these users to decrypt the encrypted program by using the key formation, whereby the program is installed in the user computer.

Besides the cases where the aforementioned functions according to the embodiments are implemented by executing the read program by a computer, an operating system, or the like, running on the computer, may perform all of or a part of the actual processing, so that the functions of the foregoing embodiments can be implemented by this processing.

Furthermore, after the program read from the storage medium is written to a function expansion board inserted into the computer or to a memory provided in a function expansion unit connected to the computer, a CPU, or the like, mounted on the function expansion board or function expansion unit performs all of or a part of the actual processing, so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A recording apparatus that is connectable to a printing apparatus for managing attribute information regarding data recordable on a recording medium, associated with an identifier that is added to the recording medium and enables individually identifying the recording medium, the recording apparatus comprising:

(i) a reading unit adapted to read the identifier from the recording medium;

(ii) a transmission requesting unit adapted to request the printing apparatus to transmit first attribute information being managed associated with the identifier;

(iii) an obtaining unit adapted, when the first attribute information is received from the printing apparatus in response to the request, to obtain data corresponding to the received first attribute information among data stored in a data storage unit; and (iv) a recording unit adapted to record the obtained data on the recording medium.

2. The recording apparatus according to claim 1, wherein, when a notification that the attribute information associated with the identifier is not managed is received from the printing apparatus, said recording unit records, on the recording medium, data selected by a user among data stored in said the data storage unit.

3. The recording apparatus according to claim 1, wherein said reading unit reads the identifier from the recording medium in response to a data recording start instruction from a user.

4. The recording apparatus according to claim 1, further comprising a detection unit adapted to detect loading of the recording medium in the recording apparatus, wherein said reading unit reads the identifier from the recording medium in response to detection of the loading by said detection unit.

5. A recording method utilizing a recording apparatus that is connectable to a printing apparatus for managing attribute information regarding data recordable on a recording medium, associated with an identifier that is added to the recording medium and enables individually identifying the recording medium, the method comprising:

a reading step of reading the identifier from the recording medium;

a transmission requesting step of requesting the printing apparatus to transmit attribute information being managed, associated with the identifier;

an obtaining step of, when the attribute information is received from the printing apparatus in response to the request, obtaining data corresponding to the received attribute information among data stored in a data storage unit; and a recording step of recording the obtained data on the recording medium.

* * * * *